(12) United States Patent
Sanqunetti

(10) Patent No.: US 6,721,652 B1
(45) Date of Patent: Apr. 13, 2004

(54) IMPLEMENTING GEO-FENCING ON MOBILE DEVICES

(75) Inventor: Douglas R. Sanqunetti, Cicero, IN (US)

(73) Assignee: Electronic Data Systems Corporation (EDS), Plano, TX (US)

( * ) Notice: Subject to any disclaimer, the term of this patent is extended or adjusted under 35 U.S.C. 154(b) by 0 days.

(21) Appl. No.: 10/301,994

(22) Filed: Nov. 22, 2002

(51) Int. Cl.[7] .............................................. G01C 21/30
(52) U.S. Cl. ...................................................... 701/207
(58) Field of Search ................................ 701/200–203, 701/207, 208, 210, 213, 214, 225, 300–302, 1–4, 25–26, 28; 382/293–297

(56) References Cited

U.S. PATENT DOCUMENTS 5,724,040 A * 3/1998 Watnick ...................... 342/26
5,801,970 A * 9/1998 Rowland et al. ............... 703/6
6,185,343 B1 * 2/2001 Ikeda et al. .................. 382/291

* cited by examiner

*Primary Examiner*—Thu V. Nguyen
(74) *Attorney, Agent, or Firm*—Fish & Richardson P.C.

(57) ABSTRACT

A location of a vehicle is monitored using a predefined geo-fencing boundary within a coordinate system. An angle between a selected straight edge of the boundary and an axis of the coordinate system is determined, and the boundary is rotated by the angle such that the selected straight edge of the rotated boundary is parallel to the axis of the coordinate system. Subsequently, a set of coordinates associated with a particular location of a monitored device are identified and rotated by the previously determined angle. The rotated set of coordinates is then compared to the rotated boundary to determine a location of the monitored device with respect to the selected boundary. This information can be used to determine whether the vehicle remains within the predefined geo-fencing boundary.

22 Claims, 5 Drawing Sheets

IMPLEMENTING GEO-FENCING ON MOBILE DEVICES

TECHNICAL FIELD

This description relates to detecting the location of a vehicle, and more particularly to monitoring the position of a vehicle with respect to a predetermined virtual boundary.

BACKGROUND

Without some type of reliable monitoring system, companies that use large fleets of vehicles are subject to misuse or theft of their fleet vehicles. For example, it is likely that some vehicles in a large fleet will be used by employees without authorization or will at least occasionally be the target of auto thieves. In addition, even employees who are authorized to use a vehicle for some purposes may, in some instances, deviate from an authorized route or otherwise make an unauthorized use of the vehicle. One way to reduce these problems is to install tracking devices in the vehicles of a fleet. Such tracking devices can enable a fleet manager to monitor the location of vehicles of the fleet.

To simplify the monitoring process, a "geo-fencing" routine may be used to allow a fleet manager to establish a virtual boundary around a predetermined location for purposes of automatically notifying the fleet manager when a vehicle crosses the boundary.

SUMMARY

Techniques are provided for monitoring a location of a vehicle or other mobile device. In one implementation, a route can be defined as a collection of overlapping rectangular boundaries in a coordinate system. Each rectangle is then transformed by rotating the rectangle by a corresponding angle such that the sides of the rotated rectangle are parallel to the axes of the coordinate system. Coordinates for each rotated rectangle, along with the corresponding angle, are stored in a device to be monitored. Subsequently, coordinates associated with the current position of the monitored device are compared with one or more rectangles in the route by rotating the monitored device coordinates by one of the corresponding angles and comparing the rotated position coordinates with the appropriate rotated rectangle. If the current position is outside of the route, some predefined action, such as notifying a fleet dispatch manager, can be initiated.

The more complex calculations, namely the calculation of the angle and the rotation of the boundary by the angle, can be performed on a desktop computer or other device with significant processing power. This allows an embedded device or other device to be monitored to conveniently and efficiently determine whether it is located inside or outside of a predefined boundary without requiring substantial processing resources. For example, the monitored device can simply compare rotated coordinates associated with its current location with coordinates defining two opposite corners of a rotated rectangular boundary to determine if the monitored device is within the predefined boundary.

In one general aspect, a boundary that includes at least one straight edge within a coordinate system is selected. An angle between a selected straight edge of the boundary and an axis of the coordinate system is calculated, and the boundary is rotated by the calculated angle such that the selected straight edge of the rotated boundary is parallel to the axis of the coordinate system. When a set of coordinates associated with a particular location of the vehicle or other monitored device is identified, the identified set of coordinates is rotated by the previously-calculated angle. Finally, the rotated set of coordinates is compared to the rotated boundary to determine a location of the monitored device with respect to the boundary.

Implementations may include one or more of the following features. For example, the boundary can be a rectangle and the comparison of the rotated coordinates to the boundary can involve determining if the particular location is within the rectangle. If not, then the location might be compared to an adjacent rectangle in a collection of rectangles that define a route. The adjacent rectangle can also be rotated so that its sides are parallel to the coordinate axis, and the location coordinates can be rotated by the same angle as the adjacent rectangle to simplify the comparison process. Each rectangle can be defined by coordinates of two opposite corners of the rectangle. The boundary can also be a straight line having endpoints that are rotated by a corresponding angle. A pre-selected response can be initiated depending on the outcome of the comparison.

In another general aspect, a system for facilitating location monitoring may include a locator operable to identify a location of a monitored device, a memory, and a processor. The memory stores at least one angle of rotation and one or more sets of rotated coordinates. The rotated coordinates are associated with a predetermined boundary in a coordinate system, and correspond to original coordinates that define the predetermined boundary. Each of the original coordinates can be rotated by a corresponding angle of rotation to generate the corresponding rotated coordinates prior to storing the rotated coordinates in the memory. The rotated coordinates define at least one segment of a rotated boundary. The processor rotates coordinates representing the identified location by at least one of the stored angles of rotation to calculate rotated location coordinates. In addition, the processor compares the rotated location coordinates with at least two of the rotated coordinates to determine a relative position between the monitored device and the predetermined boundary.

In some implementations, the system may include one or more of the following features. For example, the monitored device can include the locator, the memory, and the processor.

The system might also include a mobile transmitter operable to selectively send a message based on the position of the monitored device relative to the predetermined boundary. The system may include a remote device operable to receive the message and initiate a predetermined response to the message.

The memory can store data corresponding to segments of the rotated boundary, with each segment identified by at least two sets of routed coordinates and having an associated angle of rotation. In such an implementation, the boundary may represent a geographic route and each segment comprises a rectangle defining a portion of the route. A second processor can be used to calculate the angle of rotation and to rotate the boundary prior to storing the angle and rotated coordinates in the memory. Each angle of rotation is defined by an angle between an axis of the coordinate system and a straight edge of the predetermined boundary associated with the original coordinates to be rotated. Each segment of the rotated boundary can have at least one edge that is parallel to an axis of the coordinate system. The locator can be a GPS receiver.

In yet another general aspect, monitoring a location of a vehicle may include storing at least two sets of rotated coordinates associated with a predetermined rectangular boundary. The rotated coordinates correspond to at least two sets of original coordinates that define the predetermined rectangular boundary in a coordinate system. Each set of original coordinates is rotated by an angle of rotation to generate the corresponding set of rotated coordinates prior to storing each set of rotated coordinates. The rotated coordinates define a rotated rectangular boundary having sides that are parallel to axis of the coordinate system. The angle of rotation, which is defined by an angle between one of the axes of the coordinate system and a side of the predetermined rectangular boundary, is then stored. Subsequently, a location of a vehicle is identified, and coordinates representing the identified location of the vehicle are rotated by the angle of rotation to generate a rotated set of location coordinates. Finally, the rotated set of location coordinates is compared with the sets of rotated coordinates to determine a relative position between the vehicle and the predetermined rectangular boundary.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A geo-fencing routine can be used to automatically initiate a predetermined response or action when a vehicle crosses a predefined virtual boundary. One implementation is in the context of having a fleet dispatch manager monitor vehicles. However, it should be understood that the routine can be used in other types of applications where it is desirable to monitor whether a vehicle, a mobile unit, or another monitored device has crossed one or more virtual boundaries.

In the case of monitoring vehicles of a fleet, a fleet dispatch manager can restrict certain vehicles in a fleet from deviating from a predetermined route by defining a geofence or virtual boundary along the route. Each time the boundary is crossed, a predefined response, such as an alert sent to the dispatch manager's phone, PDA, desktop PC, or the like, can be automatically triggered. The fleet manager can then determine the cause of the deviation. If the fleet manager determines that the boundary has been crossed for an unauthorized, dangerous, or otherwise invalid reason, the fleet manager can remotely disable the vehicle, or take other appropriate action.

The described techniques have a number of valuable applications. For example, they have vast implications with regard to homeland security in that they can be used to help prevent vehicles carrying hazardous, dangerous, or valuable cargo from being stolen. Similarly, they can prevent vehicles themselves from being stolen or used for unauthorized or illegal purposes. The techniques can also enable a fleet operator to automate many costly and time consuming, yet time sensitive operations, such as advance warning prior to arrival at customer sites, depots, ports, load collection sites or any other desired location. Each unit in a fleet may be programmed or instructed to automatically notify the fleet controller or some other person or entity when leaving, or prior to reaching, specific locations.

When implementing position detection algorithms on mobile devices, particularly on embedded devices that have limited processing power, reducing the number of calculations required to perform useful work helps to avoid overburdening the local processor of the mobile device. Determining whether a vehicle's current position is within a predefined driving route can involve a relatively CPU-intensive calculation.

The described techniques provide an efficient way of defining a route and determining whether coordinates associated with a particular location lie within the defined route. In particular, the techniques allow the majority of the calculations necessary for implementing a geo-fencing routine to be performed on a desktop computer or other high-powered processing device and require very little processing or communications by the monitored mobile device.

Figure 1:
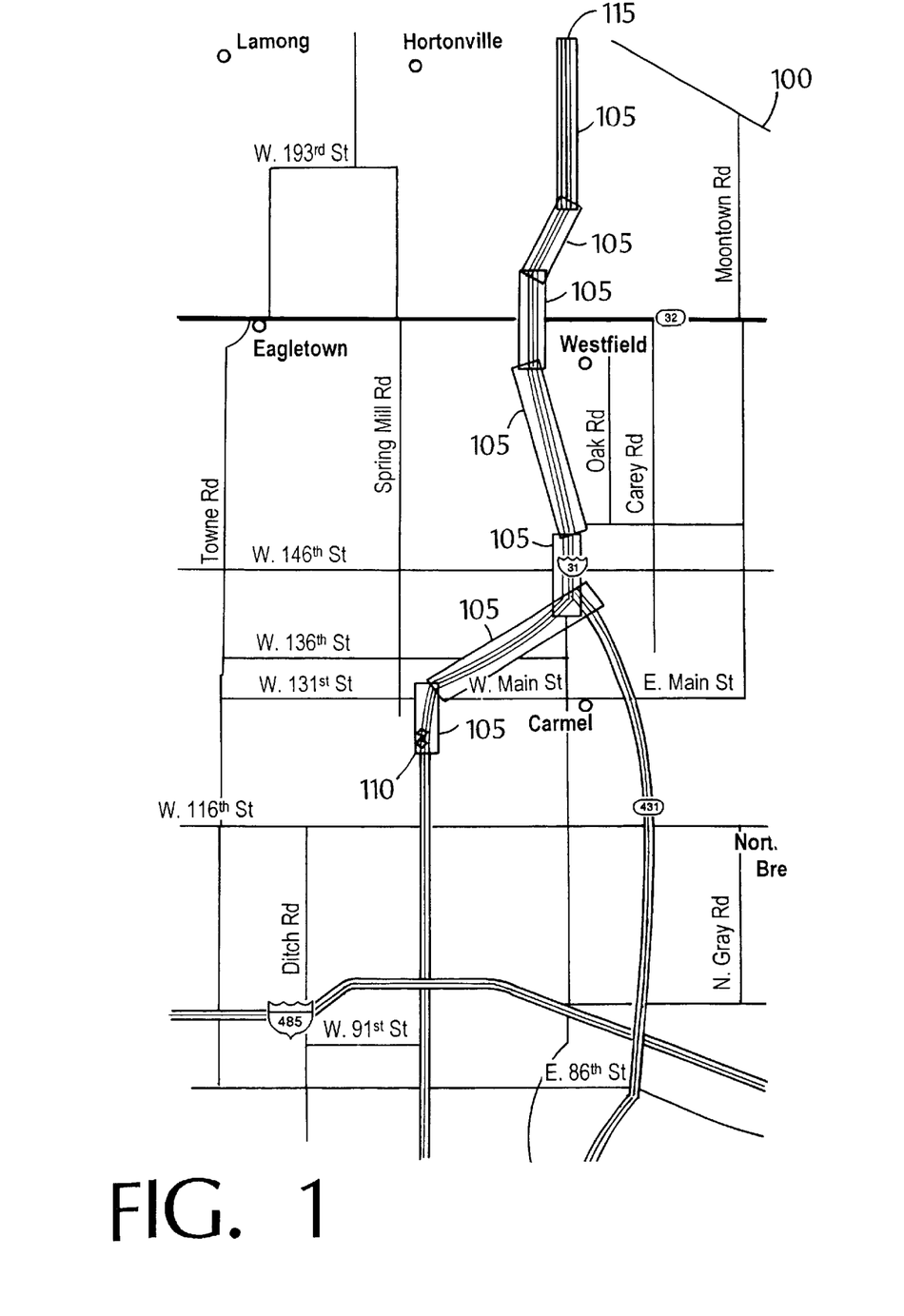
FIG. 1 is an illustrative example of a predefined route.

Initially, one or more boundaries are defined. For example, a fleet dispatch manager may identify a permissible route by defining a series of rectangles along the predetermined route. For example, FIG. 1 shows an illustrative example of a predefined route on a map 100. In particular, the map includes a series of overlapping rectangles 105 that define a predetermined driving route from a starting point 10 to an ending point 115. Each rectangle 105 is defined by the coordinates (e.g., GPS coordinates, latitude/longitude, and the like) of the rectangle's corners.

Figure 2A:
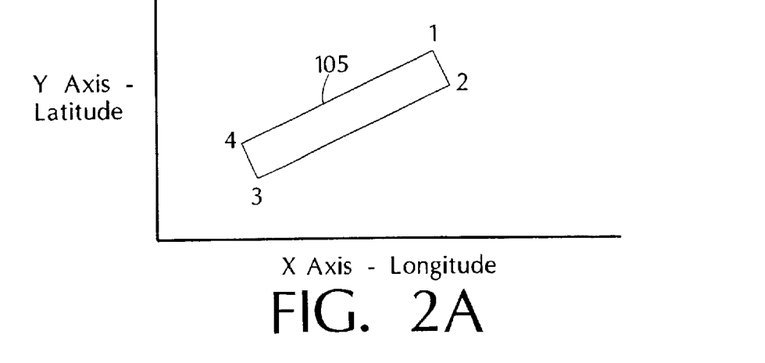
FIGS. 2A–2C depict a process for ordering the coordinates that define each route rectangle.
Figure 2B:
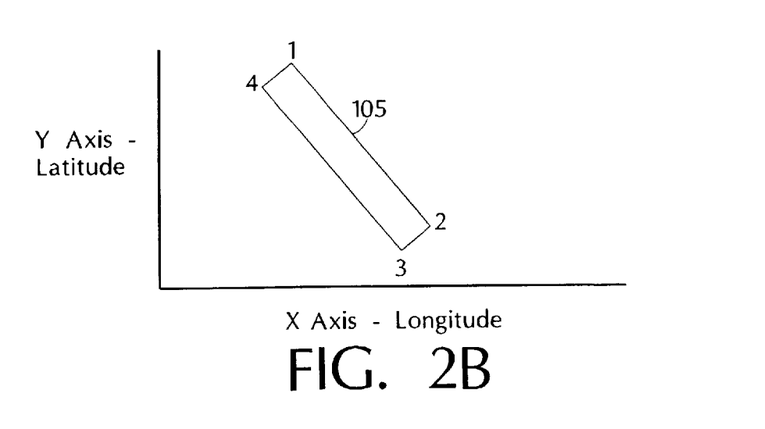
Figure 2C:
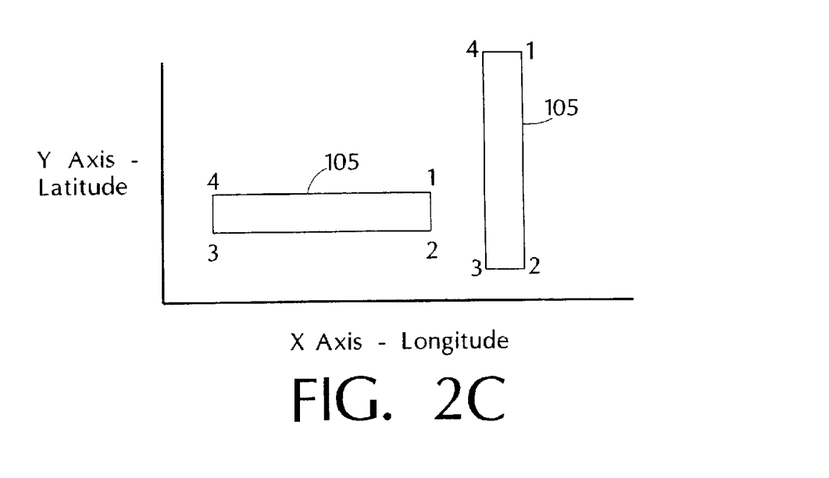

FIGS. 2A–2C illustrate a process for ordering the coordinates that define each route rectangle 105. It will be understood that this process is primarily used for purposes of convenience and consistency in identifying rectangles 105 and that this process is not critical. In accordance with the illustrated numbering scheme, where the rectangle's sides are not parallel with the X- and Y-axis, corner 1 is the corner with the maximum Y value. In cases where the rectangle 105 has sides parallel to the X- and Y-axis, corner 1 is the corner of the rectangle 105 that has the maximum X value and the maximum Y value. In either case, the other corners are defined in a clockwise manner with respect to corner 1.

Once a route is defined as a series of rectangles 105, each rectangle 105 is rotated about the origin by a corresponding angle α such that the sides of the rotated rectangle are parallel to the X-axis and the Y-axis. This rotational transformation can be performed on a desktop computer so that the mobile or embedded device has less work to do when determining a position relative to the defined route. After the rotational transformation, the rotated coordinates that define the rotated rectangle and the corresponding angle α are loaded in a memory of the mobile or embedded device located on or in the vehicle to be monitored.

Subsequently, the vehicle's position is determined using, for example, a Global Positioning System (GPS) satellite receiver. To determine whether the vehicle is located within a particular rectangle of the predefined route, the positional coordinates are then rotated by the angle α associated with the particular rectangle, and the rotated positional coordinates are compared with the stored rotated coordinates for the particular rectangle. Depending on the outcome of this comparison, the mobile or embedded device can (1) do nothing, (2) send a predefined response to a central monitoring location, or (3) check the current location versus another rectangle in the overall route.

In performing the initial rotational transformation of the coordinates that define the rectangles 105, each rectangle 105 is first examined to determine whether it is situated with sides parallel to the X-axis and the Y-axis. If the sides are parallel to the axes, then no rotational transformation of the rectangle 105 is necessary. If, on the other hand, the rectangle's sides are not parallel to the X-axis and the Y-axis, the rectangle 105 is rotated so that the sides are parallel to the axes.

Figure 3:
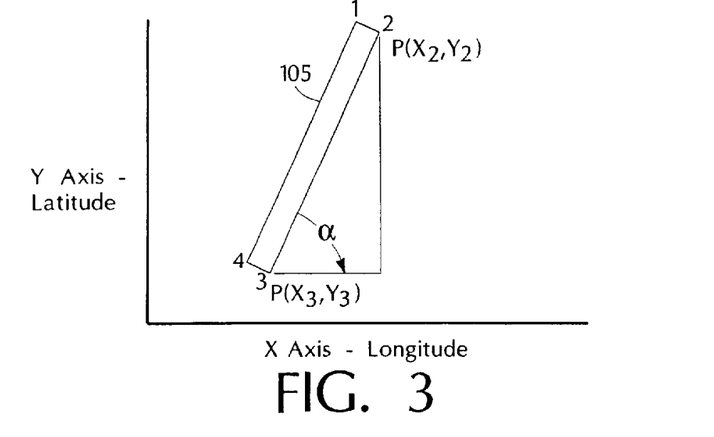
FIG. 3 is a diagram illustrating the determination of the angle α of a route rectangle.

To perform the rotational transformation, the angle α is determined for each rectangle 105. FIG. 3 provides a diagram illustrating the determination of the angle α, which represents an angle of rotation necessary to make the rectangle 105 parallel to the X-axis and the Y-axis. For purposes of illustrating the determination of the angle α, an imaginary right triangle is formed with the side of the rectangle between point 2 and point 3 as the hypotenuse. The length of the side of the triangle opposite the angle a is determined by:

$$\Delta Y = Y_2 - Y_3,$$

and the length of the side of the triangle adjacent the angle α is determined by:

$$\Delta X = X_2 - X_3.$$

Next, the length of the hypotenuse is calculated by:

$$h = \sqrt{\Delta X^2 + \Delta Y^2}.$$

The angle α can then be determined by:

$$\alpha = \arcsin(\Delta Y/h) \times (-1),$$

wherein the multiplication by −1 is used to produce a clockwise rotation. It will be recognized that the foregoing procedure for determining the angle α is illustrative only and that the angle of rotation also may be determined in other ways. For example, rectangle sides other than the one between corners 2 and 3 can be used. In addition, the rectangle 105 might also be rotated in a counterclockwise direction by an angle β that equals 90−α. Moreover, instead of calculating the angle α using an arcsine function, an arccosine or arctangent function also may be used.

Figure 4:
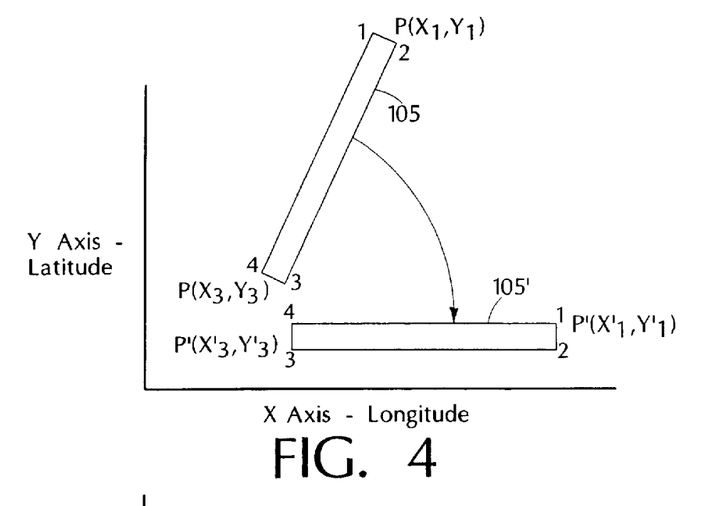
FIG. 4 is schematic diagram of a rotational transformation of a route rectangle.

FIG. 4 shows a rotational transformation of a rectangle 105 into a rectangle 105' that is parallel to the X-axis and the Y-axis. The rotational transformation can be accomplished by calculating the rotated coordinates for each corner of the rectangle 105 using the following equations:

$$X' = X \cos(\alpha) - Y \sin(\alpha)$$

$$Y' = X \sin(\alpha) + Y \cos(\alpha)$$

Although it is possible to transform all four corners using these equations, it is generally sufficient to transform the two sets of coordinates representing opposite corners because these two sets of coordinates are sufficient to define the rotated rectangle 105'. Thus, the X and Y coordinates for each of points 1 and 3, for example, can be plugged into the above equations to generate the coordinates for corners 1 and 3 of the rotated rectangle 105'.

In one implementation, the route is saved in XML format as a series of rotated rectangles 105'. The rectangles are defined by the set of coordinates for each corner, and their corresponding angles of transformation (α). As mentioned above, only two opposite corners of the rotated rectangle 105' are required to perform the geo-fencing comparison. Accordingly, an illustrative portion of a route definition, using only corners 1 and 3, is as follows:

<?xml version="1.0"?>
    <GEOFenceRoute>
    <Coordinate Units="DecimalDegrees"/>
    <RECTANGLE>
       <Longitude1>86.1700</Longitude1>
       <Latitude1>39.9925</Latitude1>
       <Longitude3>86.1555</Longitude3>
       <Latitude3>39.9805</Latitude3>
       <ALPHA Units="RADIANS">0.000000</ALPHA>
    </RECTANGLE>
    <RECTANGLE>
       <Longitude1>94.9208</Longitude1>
       <Latitude1>−2.7409</Latitude1>
       <Longitude3>94.9144</Longitude3>
       <Latitude3>−2.7448</Latitude3>
       <ALPHA Units="RADIANS">−0.463648</ALPHA>
    </RECTANGLE>
    <RECTANGLE>
       <Longitude1>91.0288</Longitude1>
       <Latitude1>−27.1332</Latitude1>
       <Longitude3>90.9882</Longitude3>
       <Latitude3>−27.1621</Latitude3>
       <ALPHA Units="RADIANS">−0.724866</ALPHA>
    </RECTANGLE>
    </GEOFenceRoute>

In an alternative implementation, the coordinates may also be sent to the mobile or embedded device in a binary format to save space on the device.

The mobile or embedded device reads the XML file and stores each rectangle along with its corresponding angle of rotation α. While a particular route is active in the device, the position of the vehicle to be monitored is periodically determined by a GPS receiver. Alternatively, the position of the vehicle can be determined using another type of locating system, such as a system of terrestrial towers that transmit signals to and/or receive signals from a receiver/transmitter located in or on the vehicle. Such a system can use propagation times between the vehicle and the terrestrial towers to triangulate the vehicle's position. This type of triangulation system can be implemented, for example, using a cellular telecommunication infrastructure.

When a current position of the vehicle is to be compared with a particular rectangle, the positional coordinates (e.g., GPS coordinates) are first rotated, if necessary, by the corresponding angle at If the stored angle α is zero, then no rotation of the positional coordinates is performed. On the other hand, if the angle α is not equal to zero, the positional coordinates go through the same rotational transformation as the rectangle. The mobile or embedded device then checks to see if the positional coordinates are within the rotated rectangle 105' by performing simple comparisons with the corners of the rotated rectangle 105'. If the vehicle is not within the current rectangle 105, then the next and previous rectangles 105 are checked. If the vehicle is not in any of these rectangles 105, then the vehicle has deviated from the predefined route.

Figure 5:
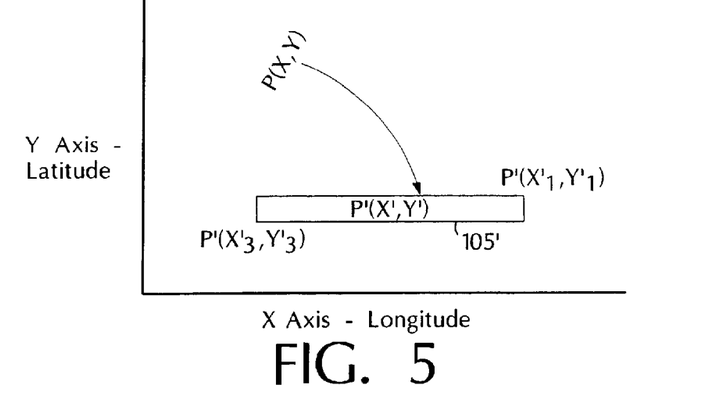
FIG. 5 is a diagram illustrating the rotational transformation of a set of positional coordinates.

FIG. 5 illustrates the rotational transformation of a set of positional coordinates. This transformation uses the same equations as the transformation of the route rectangles 105 performed on the desktop before the coordinates of the rotated rectangle 105' are saved on the mobile or embedded device. In particular, the positional coordinates are rotated using:

$$X' = X\cos(\alpha) - Y\sin(\alpha)$$

$$Y' = X\sin(\alpha) + Y\cos(\alpha)$$

The rotated positional coordinates are then compared with the coordinates of the rotated rectangle 105'. If $X' \leq X_1'$, $X' \geq X_3'$, $Y' \leq Y_1'$, and $Y' \geq Y_3'$, then the vehicle is within the current rectangle 105.

The majority of the calculations performed to define a route and determine whether a set of coordinates lie inside the defined route are performed on a desktop machine or other computer with a significant amount of processing power. The results of these calculations are saved within a route definition and loaded on the mobile or embedded device. As a result, the mobile or embedded device needs to perform relatively few calculations, which permits the use of less powerful and less expensive CPUs to perform the geo-fencing function.

Figure 6:
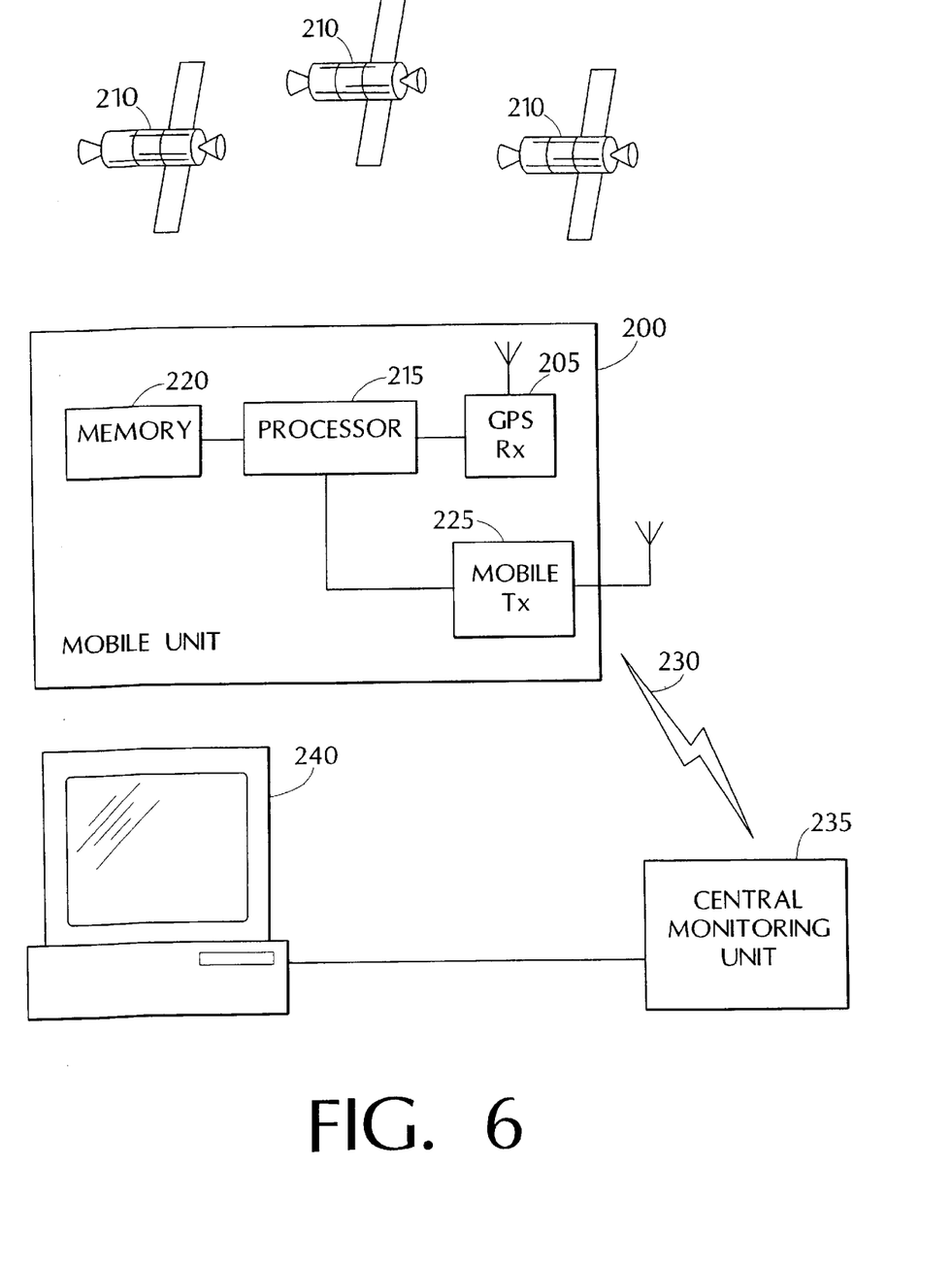
FIG. 6 is a diagram of a representative system for monitoring the position of a mobile unit.

FIG. 6 illustrates a representative system for monitoring the position of a mobile unit 200. The mobile unit 200 represents the vehicle or other device for which a position is to be monitored. The mobile unit 200 includes a GPS receiver 205 that can determine the current position of the mobile unit 200 based on signals received from GPS satellites 210. The mobile unit 200 also includes a processor 215.

The processor 215 can be part of an embedded device (e.g., an onboard computer with limited functionality) or can be a general use processor that is part of the mobile unit 200. A memory 220 stores a route description that includes a series of rectangles 105' that, prior to being loaded into the memory 220, have been rotated to be parallel to the axes of the GPS coordinate system. In addition, the route description includes an angle of rotation corresponding to each rotated rectangle 105'.

The route description can be loaded into the memory 220 through a wired or wireless interface. For example, the route description may be loaded into the memory 220 from a mobile transceiver 225 that receives the route description over a radio interface 230.

The processor 215 operates to periodically receive from the GPS receiver 205 a set of GPS coordinates that identify the mobile unit's current position. The processor 215 then transforms the received set of coordinates using one of the stored angles of rotation and compares the rotated coordinates to the corresponding rotated rectangle 105' stored in the memory 220, as described above.

If the processor 215 determines that the mobile unit 200 has crossed a boundary defined by the route description, the processor 215 initiates a predetermined response. For example, the processor 215 may use the radio interface 230 to send a message from the mobile transceiver 225 to a central monitoring unit 235. The message can be sent using any type of wireless communication infrastructure (not shown), such as a cellular telecommunication system, that then forwards the mesage to the central monitoring unit 235. The central monitoring unit 235 may include a server or other type of processor that takes some predetermined action in response to the received message, such as logging the event in a database or notifying a fleet dispatch manager through a desktop computer 240 or some other device (e.g., a pager) that includes a man-machine interface. The fleet dispatch manager can then take an appropriate action, such as disabling the monitored vehicle or contacting the driver to inquire about the nature of the deviation from the predefined route. As an alternative to wirelessly communicating the deviation, the processor 215 of the mobile unit 200 may simply log the deviation in a database stored in the memory 220 for later transfer to the central monitoring unit 235.

Figure 7:
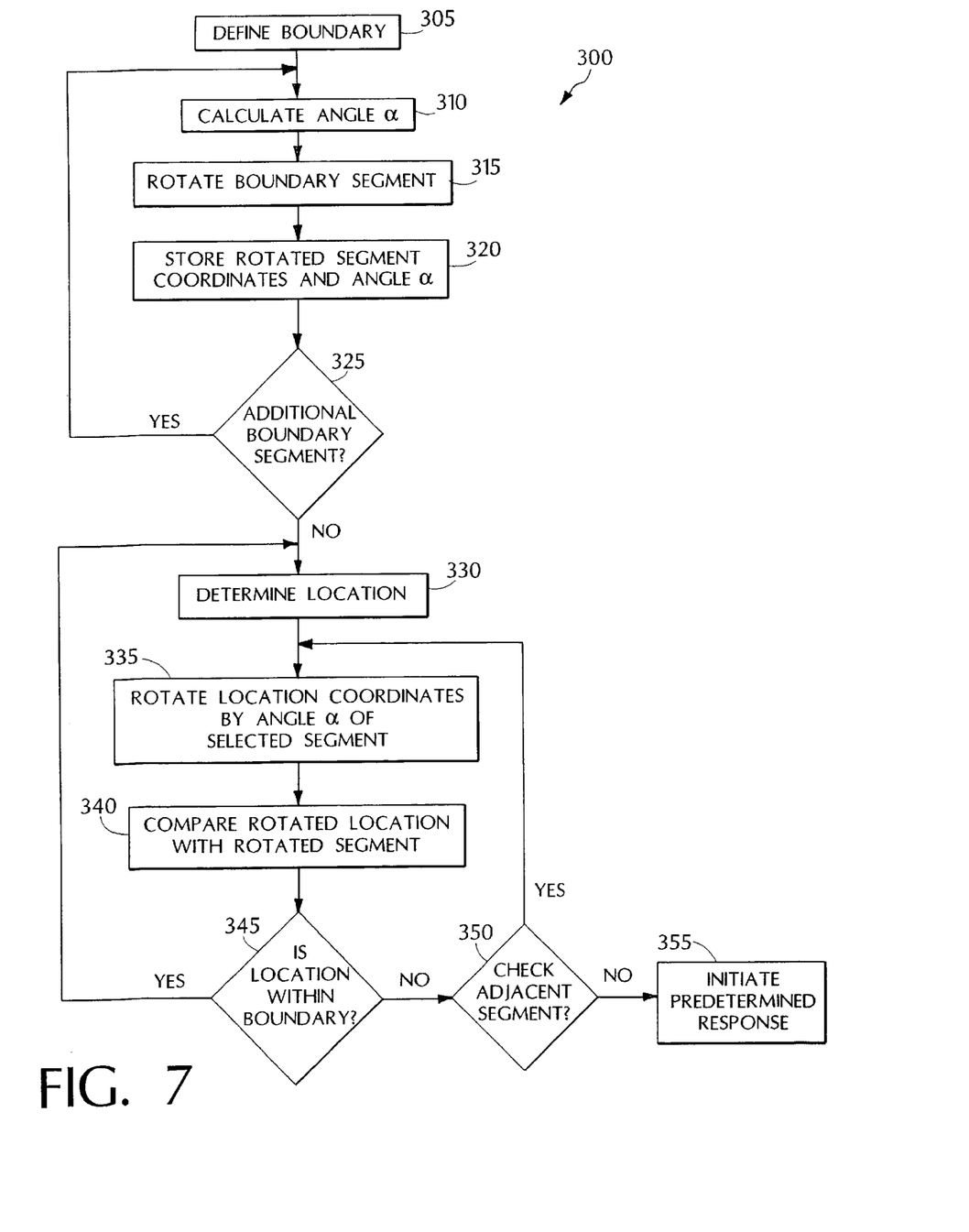
FIG. 7 is a flow diagram of a process for monitoring a location of a vehicle.

FIG. 7 illustrates a process 300 for monitoring a location of a vehicle. The process begins with defining a boundary in a coordinate system (step 305). As discussed above, the boundary may be a series of overlapping rectangles 105 that define a route. In such a case, each rectangle 105 may represent a segment of the overall boundary. Each rectangle 105 may be defined by two sets of coordinates that represent two opposite corners of the rectangle. Alternatively, the boundary may be defined by one or more straight lines, each of which is defined by the coordinates of the line's end points and each of which represents a segment of the overall boundary. A boundary that includes one or more straight lines may be used, for example, to help identify when a vehicle passes a pre-selected distance from a destination or an originating location.

Next, an angle a is calculated for a first segment of the boundary (step 310). The angle a is the angle between a straight edge of the segment and one of the axes of the coordinate system. Thus, the angle a may be the angle between one side of a rectangle and the X-axis or the Y-axis, or the angle between a straight-line segment of the boundary and the X-axis or the Y-axis. Each boundary segment is then rotated (step 315) by the angle a that corresponds to the segment, and the rotated coordinates and the angle α for the first segment are stored (step 320). For example, this information may be stored in a memory located in the vehicle or other mobile device to be monitored.

A determination then is made as to whether one or more additional boundary segments exist (step 325). If so, the angle α is calculated for the next boundary segment (step 310), the boundary segment is rotated (step 315), the rotated segment coordinates and the corresponding angle α are stored (step 320) and it is again determined if at least one additional boundary segment exists (step 325). In this manner, steps 310, 315, 320, and 325 may be repeated until all of the boundary segments in the route have been processed.

Once all of the boundary segments have been processed, a current location of the device to be monitored is determined using, for example, a GPS receiver or other locating system (step 330). Steps are then taken to compare the current location with the boundary. In making this comparison, it is desirable to avoid checking the current location against every possible segment of the boundary. Thus, the comparison may begin with the first rectangle of a series of rectangles along a route. Once the device is found to have left the first rectangle, any adjacent rectangles may also be checked. As the monitored device proceeds along the route, the comparison may be performed on a current rectangle and, if the monitored device is found to have left the current rectangle, any adjacent rectangles.

Once a current segment is selected, the coordinates of the current location are rotated by the angle at associated with the current segment (step 335). The rotated coordinates of the current location are then compared with the rotated coordinates of the selected segment (step 340). Based on this comparison, it is determined if the current location is within the boundary (i.e., based on whether the current location is within the selected segment) (step 345). If so, the current location is again determined after some delay period of variable or constant length (step 330).

If the current location is determined not to be within the selected segment (step 345), then a determination is made as to whether the current location should be checked against an adjacent segment (step 350). For example, depending on how regularly the current location is determined, it may be assumed that the monitored device cannot travel across more than a certain number of segments between consecutive comparisons (step 340). Accordingly, once the monitored device is found to no longer be located in a particular segment, a certain limited number of successive adjacent segments may be checked. Of course, if the comparisons occur on a sufficiently regular basis, it might be sufficient to check only the next and previous segments. In addition, it may be desirable in some instances to be able to detect if a monitored device backtracks on a route. In such a case, only the next adjacent segment, and not the previous segment, would be checked. If it is determined that an adjacent segment should be checked (step 350), the segment to be checked becomes the selected segment for use in steps 335, 340, and 345. If an adjacent segment should not be checked, or if the maximum number of adjacent segments has already been checked, a predetermined response, such as notifying a fleet dispatch manager, is initiated (step 355).

A number of implementations have been described. Nevertheless, it will be understood that various modifications may be made. For example, instead of monitoring whether a monitored device leaves a predefined route, the techniques may be used to determine if and when a monitored device enters a predefined area. Accordingly, other implementations are within the scope of the following claims.

What is claimed is:

1. A method for monitoring a location of a vehicle, the method comprising:

selecting a boundary within a coordinate system, the boundary including at least one straight edge;

determining an angle between a selected straight edge of the boundary and an axis of the coordinate system;

rotating the boundary by the angle such that the selected straight edge of the rotated boundary is parallel to the axis of the coordinate system;

identifying a set of coordinates associated with a particular location of a monitored device;

rotating the identified set of coordinates by the angle; and comparing the rotated set of coordinates to the rotated boundary to determine a location of the monitored device with respect to the selected boundary.

2. The method of claim 1 wherein the boundary comprises a rectangle and comparing the coordinates comprises determining whether the location of the monitored device is within the rectangle.

3. The method of claim 2 wherein the rectangle comprises one of a collection of overlapping rectangles that define a route, the method further comprising selecting an adjacent rectangle of the collection of overlapping rectangles if the location of the monitored device is not within the rectangle.

4. The method of claim 3 further comprising:

rotating the adjacent rectangle by an angle between a selected side of the adjacent rectangle and an axis of the coordinate system such that the selected side of the rotated adjacent rectangle is parallel to the axis of the coordinate system;

rotating the identified set of coordinates by the angle between the selected side of the adjacent rectangle and the axis of the coordinate system to generate a second set of rotated coordinates; and comparing the second set of rotated coordinates to the rotated adjacent rectangle to determine whether the location of the monitored device is within the adjacent rectangle.

5. The method of claim 2 wherein:

the rectangle is defined by coordinates of two opposite corners of the rectangle, rotating the boundary comprises rotating the coordinates of the two opposite corners of the rectangle by the angle, and comparing the rotated set of coordinates to the rotated boundary comprises comparing the rotated set of coordinates to the rotated coordinates of the two opposite corners of the rectangle.

6. The method of claim 1 further comprising initiating a pre-selected response based on an outcome of the comparison between the rotated set of coordinates and the rotated boundary.

7. The method of claim 1 wherein:

the selected boundary comprises a straight line identified by coordinates that define endpoints of the straight line, and rotating the boundary by the angle comprises rotating the coordinates that define the endpoints by the angle.

8. A system for facilitating vehicle location monitoring, the system comprising:

a locator operable to identify a location of a monitored device;

a memory operable to store at least one angle of rotation and rotated coordinates associated with a predetermined boundary, the rotated coordinates corresponding to original coordinates defining the predetermined boundary in a coordinate system, with each of the original coordinates being rotated by a corresponding angle of rotation to generate the corresponding rotated coordinates prior to storing each of the rotated coordinates in the memory, wherein the rotated coordinates define at least one segment of a rotated boundary; and a processor operable to rotate coordinates representing the identified location by at least one of the stored angles of rotation to calculate rotated location coordinates and to compare the rotated location coordinates with at least two of the rotated coordinates to determine a relative position between the monitored device and the predetermined boundary.

9. The system of claim 8 wherein the monitored device includes the locator, the memory, and the processor.

10. The system of claim 8 further comprising a mobile transmitter operable to selectively send a message based on the position of the monitored device relative to the predetermined boundary.

11. The system of claim 10 further comprising a remote device operable to receive the message and initiate a pre-selected response to the message.

12. The system of claim 8 wherein the memory stores data corresponding to segments of the rotated boundary, each segment identified by at least two sets of rotated coordinates from the stored rotated coordinates and having an associated angle of rotation.

13. The system of claim 12 wherein the boundary represents a geographic route and each segment of the boundary comprises a rectangle defining a portion of the geographic route.

14. The system of claim 8, further comprising a second processor operable to calculate the at least one angle of rotation and to rotate the original coordinates defining the predetermined boundary by the corresponding angle of rotation to generate the rotated coordinates prior to storing the at least one angle of rotation and the rotated coordinates in the memory.

15. The system of claim 8 wherein:

each segment has at least one edge that is parallel to an axis of the coordinate system; and each angle of rotation is defined by an angle between an axis of the coordinate system and a straight edge of the predetermined boundary associated with the original coordinates to be rotated.

16. The system of claim 8 wherein the locator comprises a global positioning satellite receiver.

17. A method for monitoring a location of a vehicle, the method comprising:

storing at least two sets of rotated coordinates associated with a predetermined rectangular boundary, the at least two sets of rotated coordinates corresponding to at least two sets of original coordinates that define the predetermined rectangular boundary in a coordinate system, wherein each set of original coordinates is rotated by an angle of rotation to generate the corresponding set of rotated coordinates prior to storing each set of rotated coordinates, and the at least two sets of rotated coordinates define a rotated rectangular boundary having sides that are parallel to axis of the coordinate system;

storing the angle of rotation, wherein the angle of rotation is defined by an angle between one of the axis of the coordinate system and a side of the predetermined rectangular boundary;

identifying a location of a vehicle;

rotating a set of coordinates representing the identified location of the vehicle by the angle of rotation to generate a rotated set of location coordinates; and comparing the rotated set of location coordinates with the at least two sets of rotated coordinates to determine a position of the vehicle relative to the predetermined rectangular boundary.

18. The method of claim 17 wherein each set of coordinates identifies a longitudinal and a latitudinal position.

19. The method of claim 17 further comprising determining whether the location of the vehicle is within the predetermined rectangular boundary based on the position of the vehicle relative to the predetermined rectangular boundary.

20. The method of claim 19 further comprising:

storing rotated coordinates associated with an additional rectangular boundary adjacent to the predetermined rectangular boundary, the rotated coordinates corresponding to original coordinates that define the adjacent rectangular boundary, wherein each of the original coordinates is rotated by a corresponding angle of rotation to generate the corresponding rotated coordinates prior to storing each of the rotated coordinates, and the rotated coordinates define a rotated adjacent rectangular boundary having sides that are parallel to axes of the coordinate system;

storing an angle of rotation for the adjacent rectangular boundary, wherein the angle of rotation for the adjacent rectangular boundary is defined by an angle between one of the axis of the coordinate system and a side of the adjacent rectangular boundary; and responsive to a determination that the location of the vehicle is not within the predetermined rectangular boundary:

rotating the set of coordinates representing the identified location of the vehicle by the angle of rotation for the adjacent rectangular boundary to generate a second rotated set of location coordinates; and comparing the second rotated set of location coordinates with the rotated coordinates associated with the adjacent rectangular boundary to determine whether the location of the vehicle is within the adjacent rectangular boundary.

21. The method of claim 20 further comprising initiating a pre-selected response if the location of the vehicle is not within the predetermined rectangular boundary and is not within the adjacent rectangular boundary.

22. The method of claim 17 wherein the predetermined rectangular boundary is one of a collection of predefined rectangular boundaries that collectively define a route.

* * * * *